United States Patent

Dybro et al.

Patent Number: 5,533,756
Date of Patent: Jul. 9, 1996

[54] SEAT BELT RETRACTOR WITH ENERGY ABSORBING LOCK WHEELS

[75] Inventors: Niels Dybro, Utica; Harold J. Miller, III, Troy, both of Mich.

[73] Assignee: AlliedSignal Inc., Morristown, N.J.

[21] Appl. No.: 362,077

[22] Filed: Dec. 21, 1994

Related U.S. Application Data

[63] Continuation-in-part of Ser. No. 286,069, Aug. 4, 1994, abandoned.

[51] Int. Cl.⁶ .................................................. B60R 22/36
[52] U.S. Cl. .................................................. 280/806
[58] Field of Search ........................................ 280/806, 735

[56] References Cited

U.S. PATENT DOCUMENTS

| | | | |
|---|---|---|---|
| 3,790,099 | 2/1974 | Beller | 242/107.4 |
| 3,927,846 | 12/1975 | Meissner | 242/107.4 |
| 3,952,967 | 4/1976 | Barile et al. | 242/107.4 R |

FOREIGN PATENT DOCUMENTS

| | | | |
|---|---|---|---|
| A-0582096 | 2/1994 | European Pat. Off. | B60R 22/46 |
| A-2303570 | 10/1976 | France | B60R 21/10 |
| A-3731697 | 4/1989 | Germany | B60R 22/46 |
| A-4228146 | 3/1994 | Germany | B60R 22/46 |
| WO-A-90/11913 | 10/1990 | WIPO | B60R 21/02 |

*Primary Examiner*—Kenneth R. Rice
*Attorney, Agent, or Firm*—Markell Seitzman

[57] ABSTRACT

A safety restraint system comprising: a safety belt system for restraining an occupant comprising: a safety belt; a retractor for protracting and retracting the safety belt, a shoulder belt support for supporting the shoulder belt portion of the safety belt; a pretensioner for providing, subsequent to activation, a preload tensile force in the shoulder belt portion in excess of a first low limit value of about 50 pounds; a load limiter for limiting the loads imparted by the shoulder belt portion to an occupant, operative after the preload acts on the shoulder belt portion, including first means for introducing a predetermined amount of slack in the shoulder belt when the belt tension is above a second low limit value and for preventing such slack introduction when belt tension is lower than such second low limit value.

18 Claims, 9 Drawing Sheets

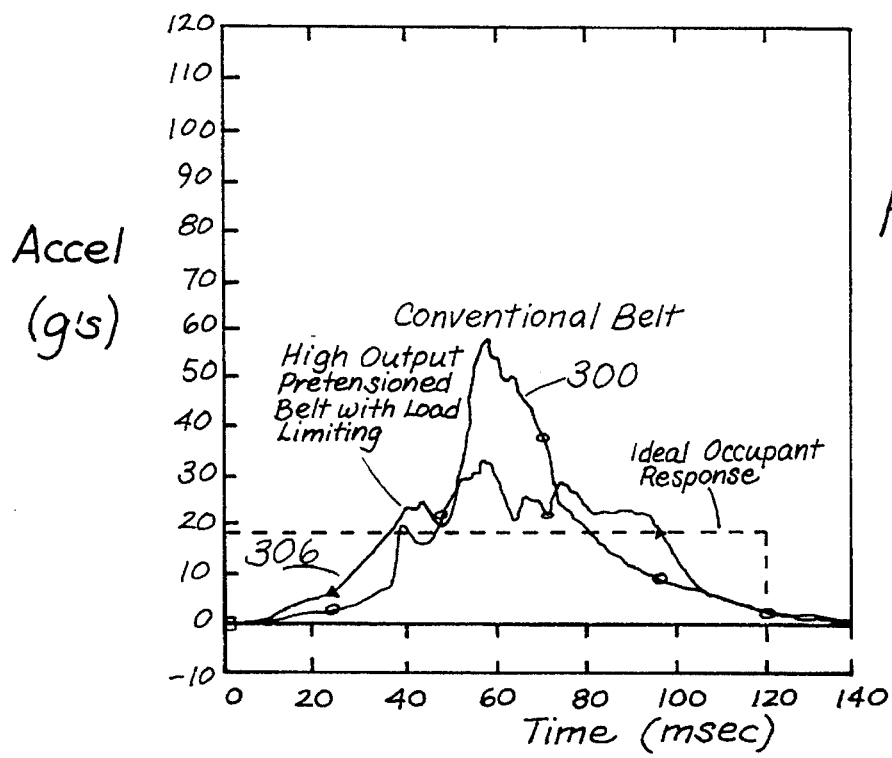
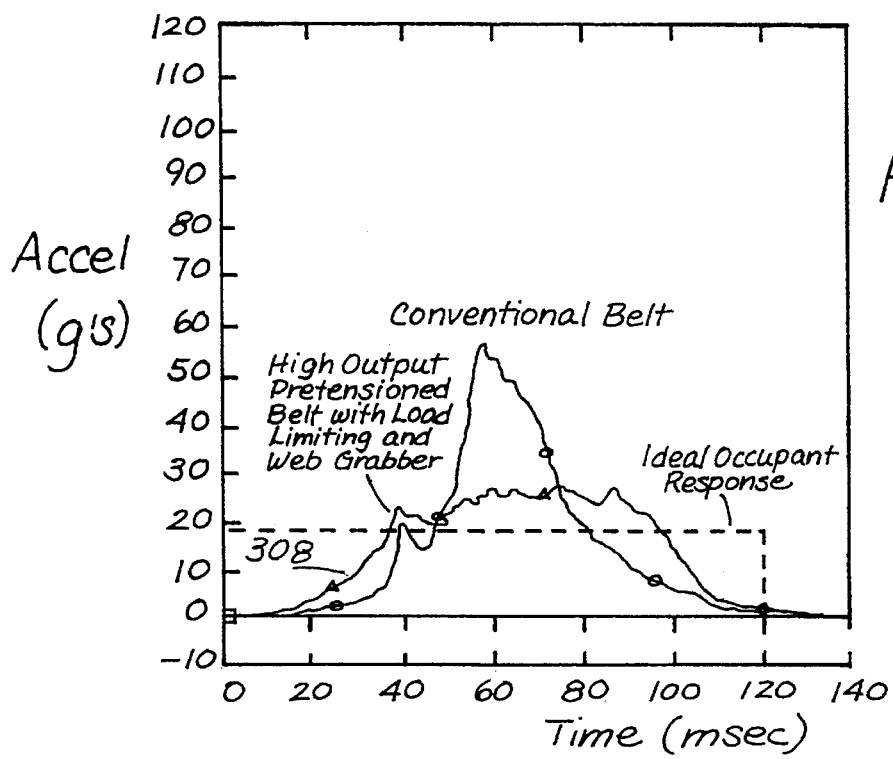

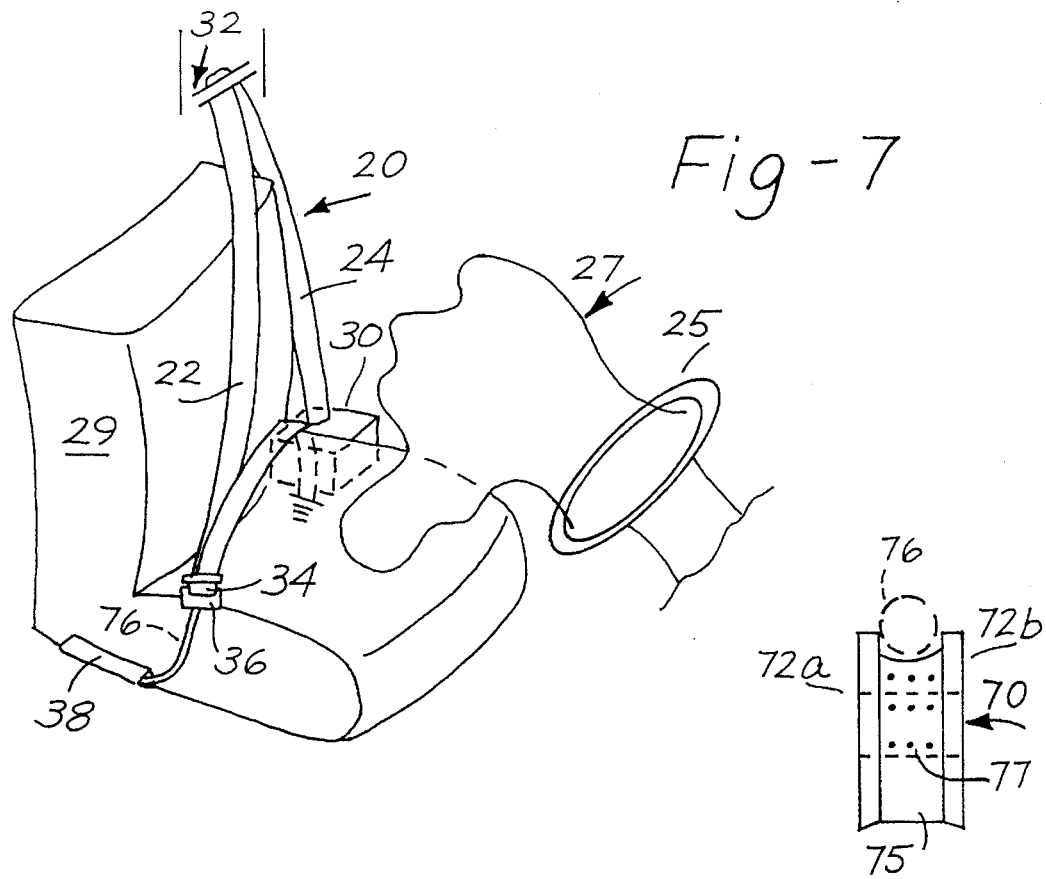
Fig-7
Fig-9
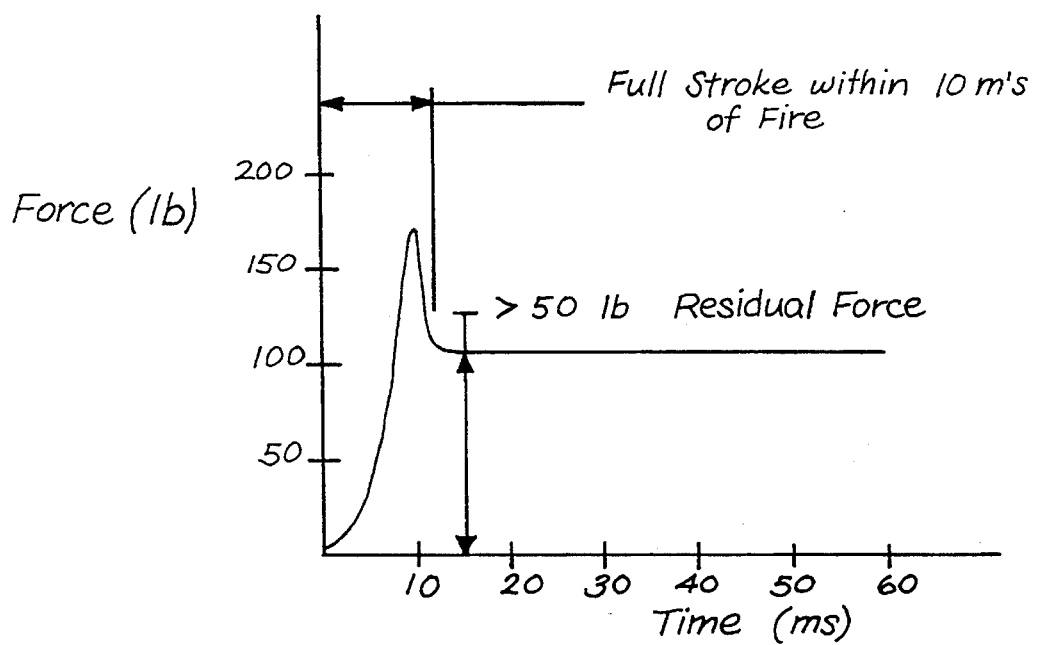
Fig-10

SEAT BELT RETRACTOR WITH ENERGY ABSORBING LOCK WHEELS

This application is a Continuation-In-Part of application Ser. No. 08/286,069, filed Aug. 4, 1994, aband. the benefit of the filing date of which is claimed under 35 U.S.C. 120.

BACKGROUND AND SUMMARY OF THE INVENTION

The present invention relates generally to occupant restraint systems and more particularly to an integrated restraint system that is designed to significantly improve occupant safety by dissipating energy.

Safety belt restraint systems (or sub-systems) and air bag systems (or sub-systems) are often designed to meet separate and distinct safety criteria and performance standards and then used together as a combined system to provide occupant protection during frontal vehicle crashes and accidents. The performance, in terms of known, measurable occupant injury performance standards such as head injury criteria (HIC) and resultant chest acceleration of these combined systems may be less than the performance of the individual subsystem. This is shown below. It is believed that the degradation in performance, as manifested by increased occupant chest acceleration and related chest loading, is the result of an effective increased stiffness afforded by the seat belt system working in concert with the air bag system.

It is an object of the present invention to provide an improved occupant protection system. The invention herein describes an improvement is occupant performance in frontal accidents in comparison to the state of the art. The present invention proposes integrating in a single belted restraint system a very high output seat belt pretensioner 38 with an energy absorbing load limiting device 30. As will be seen from the description below the invention provides a surprising improvement to occupant protection as measured by performance standards such as HIC and chest acceleration. The benefit afforded by the present invention can be further enhanced by the addition of a web clamping device (such as a web clamping retractor) and/or the use of a low elongation webbing, that is, a webbing having an elongation of less than eight percent (8%). High output pretensioning as used herein refers to any pretensioning or belt tightening device which after operation provides a residual belt force (belt tension) of fifty pounds force or more. Such high output pretensioning device, according to the present invention, may include the buckle type of pretensioner in which the seat belt buckle is linearly moved or a retractor pretensioner in which the spool of the retractor is reverse wound. The concept of high output pretensioning is not available in current products and as described below results in the very early interaction of the seat belt with the occupant and provides a significant early acting restraining force, against the occupant during the accident or crash event. Reference is made to curve 300 FIG. 1 which shows the results of a physical test of a simulated prior art combined system verifying the benefits of the present invention. Curve 300 shows the resultant chest acceleration imparted to an occupant as a result of combining a prior art seat belt sub-system with air bag sub-system. As can be seen the peak accelerative occupant loading is about 56 g's. FIG. 2 is a bar graph showing the test results (chest acceleration) for a 30 mph simulated barrier crash of: a) the prior art seat belt sub-system (1), b) the prior art air bag system each tested along (2) c) the combined seat belt and air bag performance (3) and d) the performance (4) of the integrated systems in accordance with the present invention. FIG. 3 shows comparable data showing the HIC performance criteria. From the summary data shown in FIGS. 2 and 3 it can be seen that the peak accelerative loading and head injury criteria of the combined conventional system (g=56) exceeds that of either sub-system (g=45,41), this deficiency is avoided in the present invention. The results of the integrated system show that a chest acceleration (g) of 27 is attainable. Similar improvements in the HIC performance standards can also be seen in FIG. 3.

The deficiencies in the prior art combined system can be seen from the following. During the first few milli-seconds following a crash the occupant is protected only by the seat belt system as the air bag has not yet deployed sufficiently to contact the occupant. The protective restraining forces generated by the safety belt system (or subsystem) are highly dependent on the amount of permitted occupant movement, or excursion, which is strongly dependent on the geometric placement of the seat belt system components such as the anchor points, the shoulder belt D-ring (or belt guide as it is often called) and on the amount of belt slack that exists prior to the collision as well as the inherent force deflection properties of the particular seat belt system such as the elongation of the belt and deflection characteristics of a padded seat. The net result is that the restraint force is applied to the occupant late in the collision event and such force is very uneven (i.e. includes high peaks) as can be seen for example in curve 300 of FIG. 1. Convention seat belt pretensions or belt tighteners, as they are also known, of either the buckle type or retractor type offset, to some degree the effects of occupant excursion by eliminating some of the slack that may exist in the seat belt. As is known in the art, a conventional, low output pretensioner attempts to reduce slack in the belt system prior to any forward movement by the occupant which action typically occurs during the first ten (10) to twenty (20) milli-seconds after the beginning of the collision. As known in the art such pretensions do not produce high residual forces in the seat belt. This conclusion comes directly from the way pretensioners are tested and proven in actual practice. A typical test of a pretensioner includes wrapping a test dummy with a soft foam the thickness of which simulates a certain amount of slack that would exist in actual driving conditions. The forces developed during the operation of current pretensioners are generally only sufficiently to eliminate the slack (i.e. to compress the foam) prior to the time that any significant loads are developed in the seat belt or pretensioner due to the forward motion of the occupant. The low output pretensioner effectively manages occupant energy by providing a more uniform seat belt load application, thereby somewhat reducing the intensity of occupant or belt loading. However, the deficiency of the prior art pretensioner is that belt loads can increase the concentrated nature of the loading on the chest and as a result high chest deflections still occur. Other deficiencies with the prior art pretensioner are they do not generate a sufficient amount of residual force to effective manage occupant energy to control post crash movement of the occupant. While the pretensioner usually limits the forward velocity of the occupant it also inherently reduces the amount of permitted movement of the occupant. As such the occupant is not permitted to controllably move into the inflating air bag to permit more of the restraint load to be shared by the air bag.

Another effective means for enhancing occupant performance with a belt restraint is to use a load limiter. Load limiters effectively clip or limit peak loads that normally occur in the belt system by reintroducing a certain amount of slack in the seat belt system sometime after the accident has begun. The true benefit provided by a load limiter is in relation to combined seat belt and air bag performance which is to reduce the resultant restraint force imparted to the occupant. The load limited seat belt has the advantages of restraining the occupant's torso before it is contacted by the air bag. The load limited seat belt subsystem assists in mitigating the additive loading nature of the seat belt and air bag systems. A conventional load limited belt system may result in a reduction of chest acceleration of about 10%, depending on the specific application, see curve 304 of FIG. 4. As load limiting systems reintroduce slack into the belt, excursions are typically higher compared to a more conventional belt system.

High output pretensioning devices, in accordance with the present invention, can lower chest accelerations by at least 20% due to the smoother load application. Such devices are most effective, however, when used in combination with a high energy absorbing load limiting device which may be integrated within the same device or incorporated separately. Without the high output pretensioner, it is difficult to transmit load to the load limiting device early in the accident event thereby permitting energy absorbing to also occur early in the accident event. This early onset of load and energy absorption is critical to developing the pseudo constant acceleration process in the occupant response, which is felt to be near ideal.

Energy absorption or load limiting changes the characteristic of the seat belt, primarily the shoulder harness, by changing the force-deflection properties, usually resulting in a plateau or a nearly constant force device/system. The load limiter maintains restraint forces on the occupant which do not result in high accelerations or chest deflection. Further, the energy absorption mechanism can be tuned for optimal performance in a variety of environments. The strain rate sensitivity of an energy absorbing device can offset significantly severe impacts or help larger occupants by providing a greater restraint force during high energy occurrences. Further, the energy absorbing device can be tuned to a specific vehicle crash pulse to give the optimum shape to the load profile in the belt. For example, the energy absorbing device can be made stiff to correspond with high accelerations in the vehicle pulse and less stiff during low acceleration periods in order to achieve a pseudo constant acceleration in the occupant response, limiting lowers chest accelerations about 10–30% when compared to a conventional restraint system. When the proper energy absorbing device is combined with a high output pretensioner, occupant injury criteria can be reduced by 50% or more.

The true benefit of the integrated, present system is marked reductions in occupant injury response (HIC, chest accelerations, femur loads, chest deflection, neck response etc.). The absolute ideal occupant response to vehicle deceleration could be achieved by restraining the upper torso from an initial speed to a final speed in a linear fashion with the torso and head stopping just short of the instrument panel thereby avoiding interior contact. This constant acceleration process results in the lowest possible accelerations. Further, it is desirable to decelerate the head in the same manner in unison with the torso thereby causing low head injury criteria (HIC) and low neck injury. A system simultaneously utilizing high output pretensioning and load limiting is aimed at approximating this ideal situation in the following manner:

In accordance with the present invention the high output pretensioner applies a residual force in the belt of at least fifty pounds. This results in very early application of restraining force and control of the occupant velocity build-up with respect to the vehicle interior. The resultant chest acceleration shows (see curve 302 of FIG. 1) the effect of the high output pretensioner by increasing early in the event when compared to the normal case. Hip excursions are also reduced leading to very low femur loads. The ideal constant acceleration case is shown by phantom line 306. FIG. 5, shows a time trace showing the performance attainable with both a high output pretensioner and a load limiter.

Further in the present invention the load limiting device becomes activated at 350 lb–2000 lb dynamically. The load limiter can operate in this range at a constant force level or any force profile tuned to the particular environment within these ranges although it may go out of these ranges at times. The load limiter provides a plateau in the chest resultant acceleration by providing the means for a somewhat constant restraint force and therefore somewhat constant occupant accelerations (see FIG. 5). These accelerations are well below the typical accelerations for a conventional system and approach the ideal acceleration case. The same improvement for head injury criteria is shown in see FIG. 3 results in low neck injury. Because the energy absorbing device is used in combination with a high output pretensioner, very low occupant injury (low performance injury test data) is observed with occupant excursions that are comparable or below those measured with a typical seat belt system. The load limiter may also offer reduced resistance to occupant load at a time when the airbag system begins to offer significant restraint. The load limiter may also offer increasing restraint when significant occupant excursion has occurred and it is evident when the occupant is large or the crash is quite severe. Also, the load limiter may passively or actively adjust to these various test conditions to offer optimal resistance.

The combined and tuned system may be further enhanced by the addition of a web locking device to increase the initial stiffness of the system and ensure rapid onset of restraint force. The same effect can also be observed by the use of low elongation webbing which will also stiffen the system (see curve 308 of FIG. 6).

The early restraint of the chest followed by load limiting results in low accelerations in the chest and a better introduction of the occupant into the bag. That is, the head and torso are in unison as they engage the airbag at which time the restraint force of the bag controls both body parts. The net result is an improvement in both head injury criteria and neck response (not shown).

Many other objects and purposes of the invention will be clear from the following detailed description of the drawings.

BRIEF DESCRIPTION OF THE DRAWINGS

In the drawings:

FIG. 5 shows improved system performance with a high output pretensioner and load limiter.

FIG. 6 shows improved response with the inclusion of a web locking or clamping retractor as well as a high output pretensioner and load limiter.

FIG. 7 illustrates a typical vehicle with a safety restraint system.

FIG. 9 is an isolated view of a part of the pretensioner.

FIG. 10 shows a force-time graph.

DETAILED DESCRIPTION OF THE DRAWINGS

Figure 1:
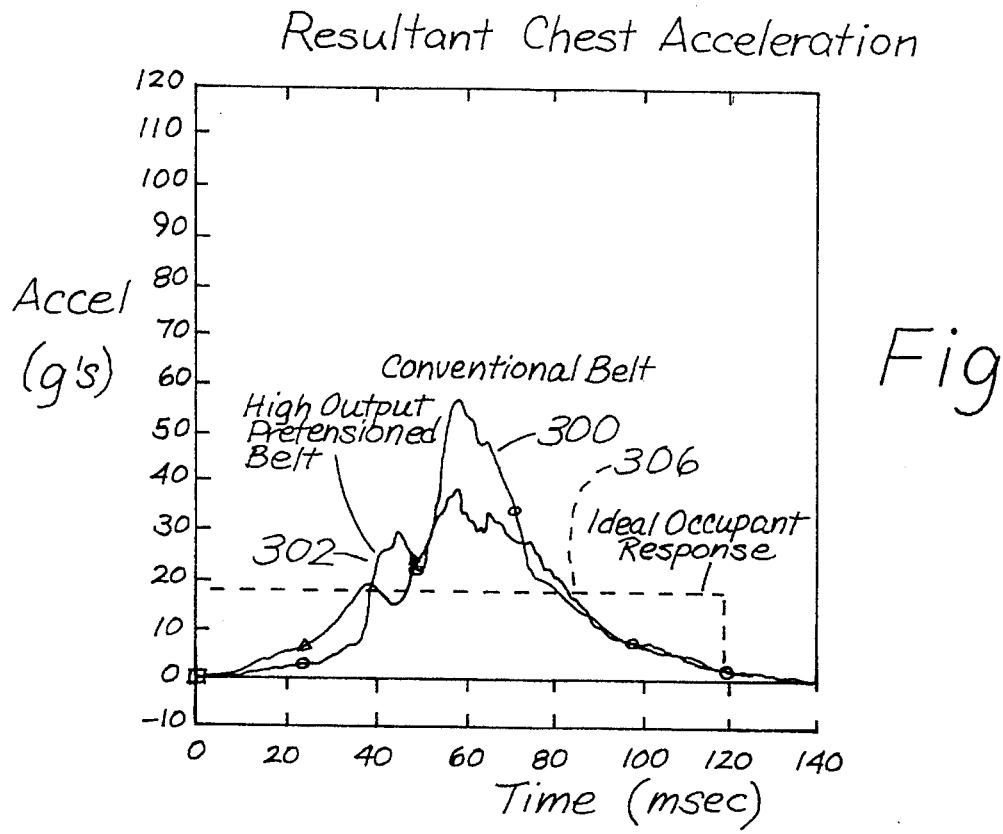
FIG. 1 shows time traces of resultant chest acceleration for various test conditions.
Figure 4:
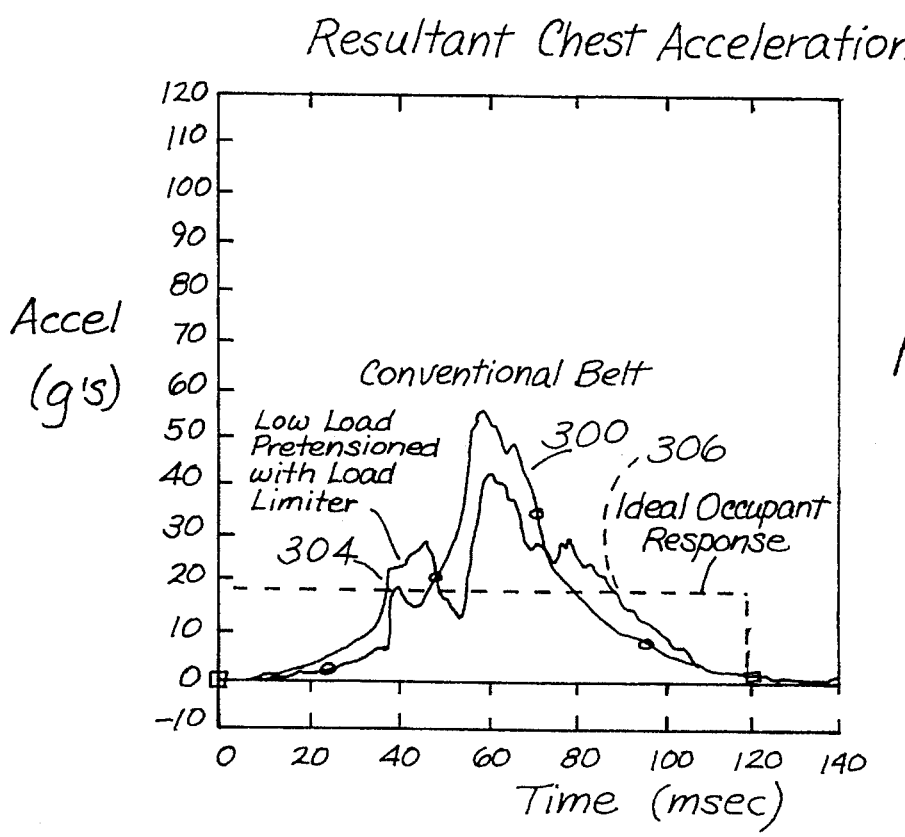
FIG. 4 shows results using a low load limiting feature in a combined system.
Figure 2:
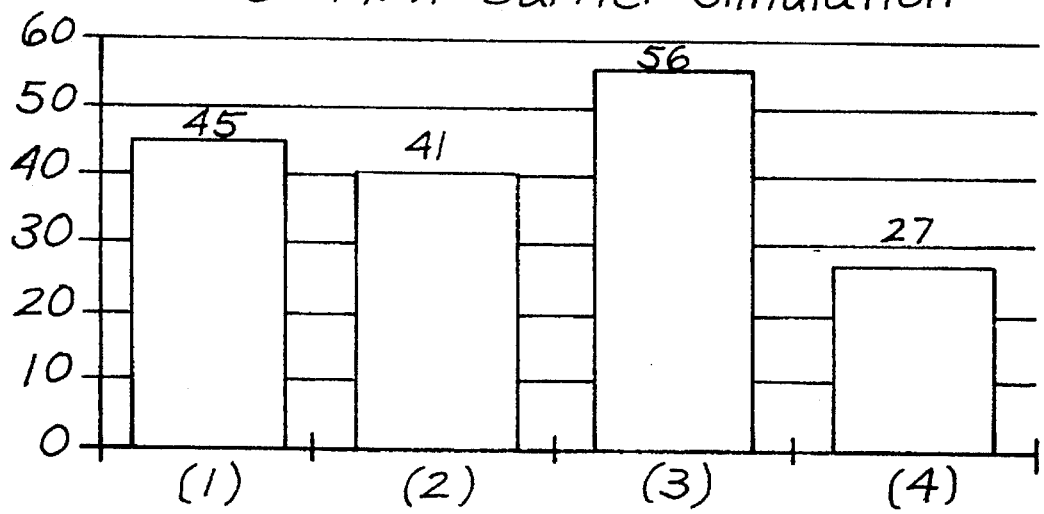
FIG. 2 is a bar graph summarizing chest acceleration.
Figure 3:
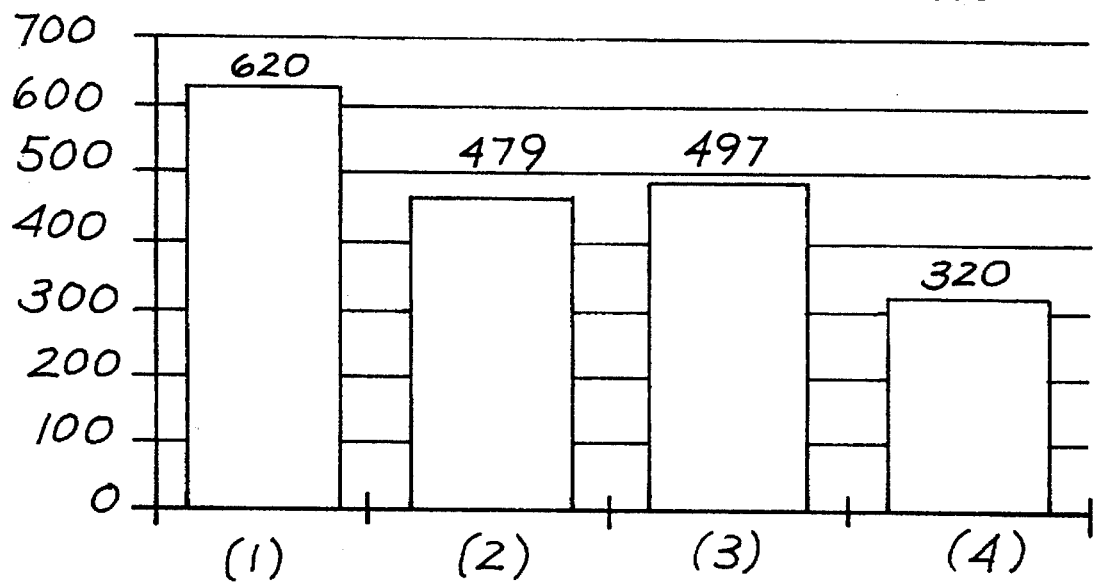
FIG. 3 is a bar graph summarizing HIC (head injury criteria).

Reference is made to FIG. 7 which diagrammatically illustrates a convention three point seat belt and air bag system generally shown as 20. The system 20 includes a safety belt 22 comprising a shoulder belt 24 and a lap belt 26 which are retracted and protracted by a retractor generally shown as 30. The shoulder belt is supported by a webbing or belt support 32 such as a web guide or D-ring. The shoulder belt 24 and lap belt 26 are slidingly joined through a tongue 34 that is received within a buckle 36 located proximate a seat 29. As illustrated, the buckle is attached to buckle pretensioner 38. Positioned in the steering wheel 25 is an air bag 27, shown deployed.

As mentioned earlier, it is an object of the present invention to provide a system having a seat belt pretensioner which after activation provides a residual belt force in excess of fifty pounds (222N). One such /buckle pretensioner 38 is shown in greater detail in FIG. 8. As illustrated, the pretensioner includes a housing 40 secured at one end to a bracket 42 and at its other end to a tube 44. More specifically, the housing includes a central, stepped bore 46 having a narrow first portion 48 and a wider central portion 50 which communicates with a stepped bore 52. One end, such as 54 of the tube is pressed fit or otherwise secured to the housing 40 at the step bore 52.

The bracket 42 includes a pin or shaft 60 and a bushing 62. Rotatably positioned on the bushing is a pulley-like, cam lock mechanism 70. The cam lock 70 includes two parallel facing walls 72a and 72b and a center reel portion 74 that may be concave shaped, as shown. The spacing "s" between the walls 72a and 72b is slightly greater than the diameter of a cable 76 connected to the buckle 36 to permit the cable to move therebetween. The cable is shown in phantom line in FIG. 9.

Reference is again to FIG. 8. As can be seen, cable 76 extends from the buckle and is threaded about the rear of the cam lock 70 about the reel portion 74 and then through an opening 48' at the bore portion 48 and into the tube 44. An end, such as 80 of the cable is secured to a movable piston 82 by known mechanical means including a clamp, weld or an adhesive bond generally shown as 84. The piston 82 is slidable within the inner wall 86 of the tube. The piston 82 includes a piston housing 90 one end of which supports a seal such as an O-ring 92.

Returning momentarily to the bracket 42, such bracket includes two outwardly extending ribs 94a and 94b positioned 90 degrees apart, which in combination with the cam lock 70 provides a channel to capture or guide the cable as it is threaded about the cam lock. While not shown in figures, the bracket 42 would be connected to a mounting bracket which may be attached to a vehicle seat or to the vehicle floor.

Figure 8:
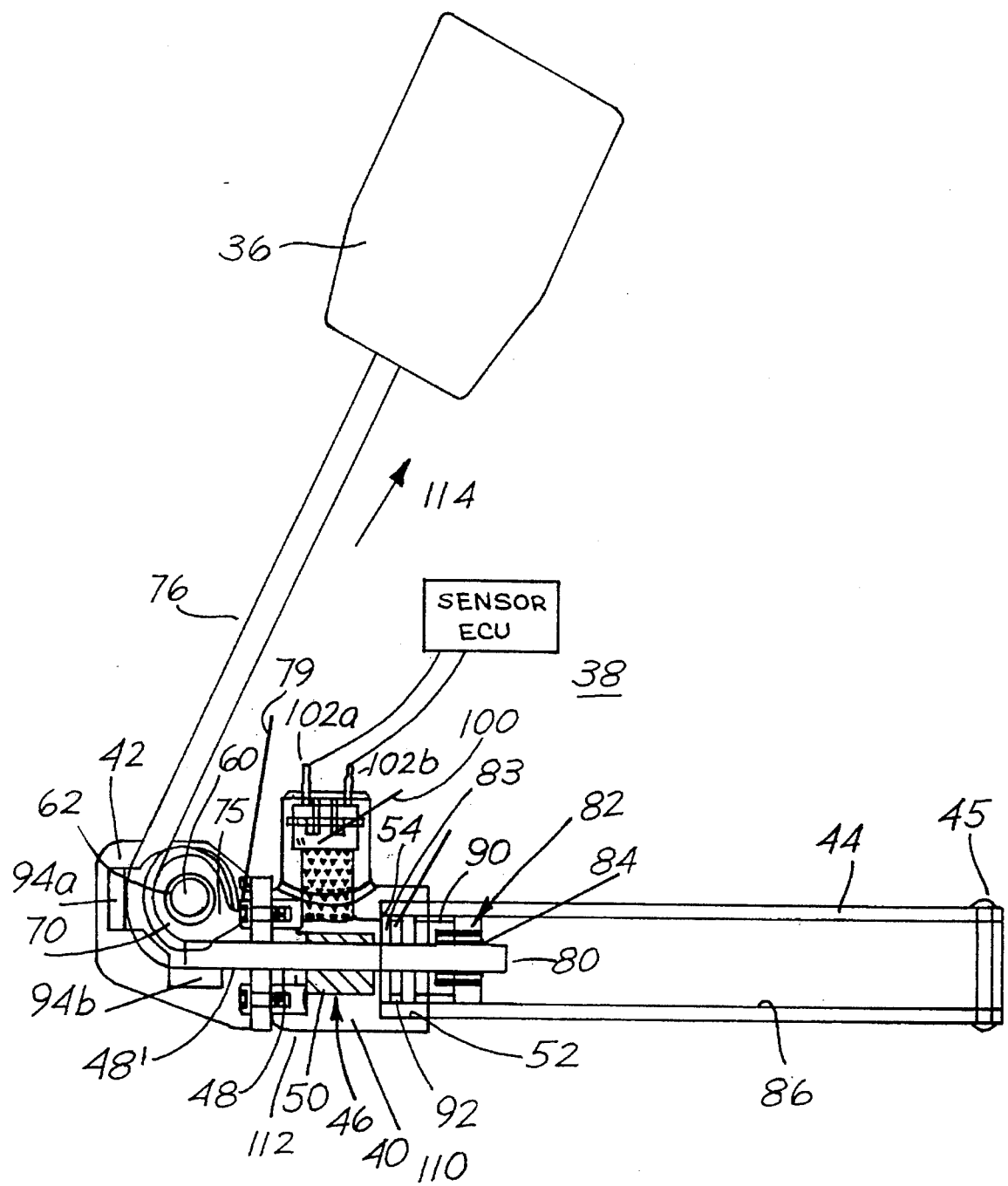
FIG. 8 shows a preferred embodiment of a high output pretensioner.
Figure 11:
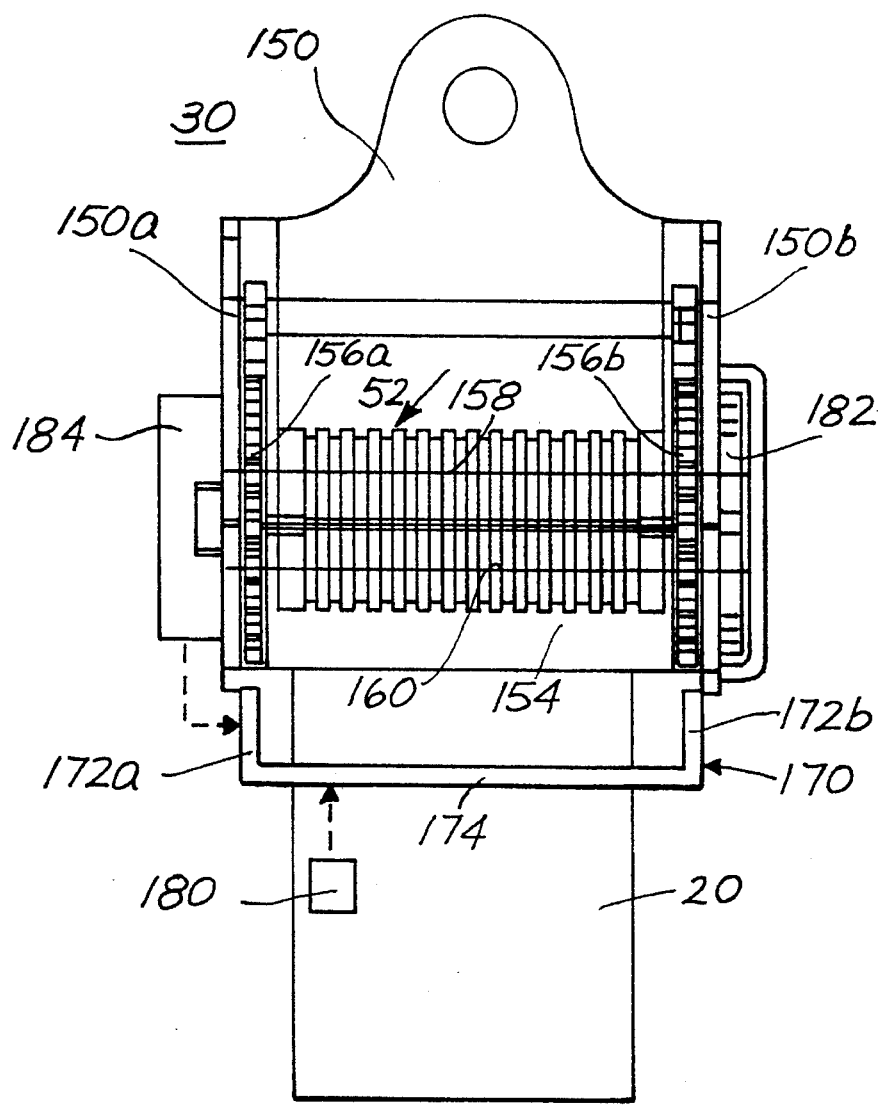
FIGS. 11–16 show a load limiting device in accordance with the present invention.
Figure 14:
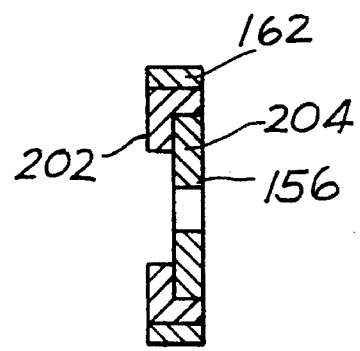
Figure 13:
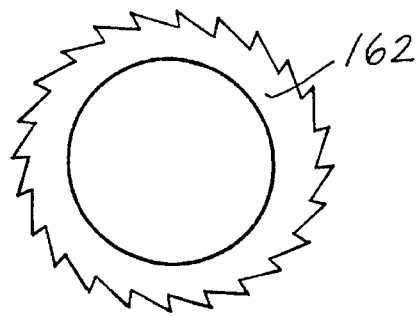
Figure 12:
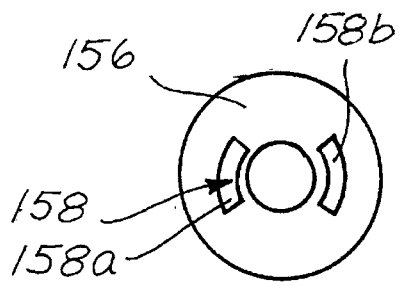
Figure 15:
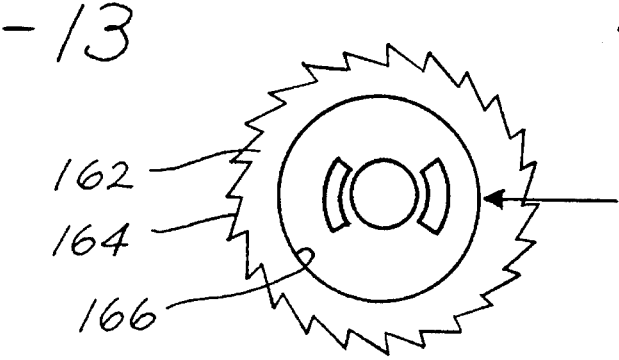

As can be seen from FIG. 8, the housing 40 supports a pyrotechnic element generally shown as 100. Such pyrotechnic elements are known in the art and are responsive to an electrical signal received at one or both of the electric terminals 102a and 102b. Upon activation of the pyrotechnic element 100, products of combustion are generated which increase the pressure within the center bore. This increased pressure bares upon the left hand end 83 of the piston 82 urging same to the right. As the piston moves to the right, it pulls the cable 76 about the cam lock 70 thereby lowering the height of the buckle relative to the vehicle seat or floor removing a predetermined amount of slack in one or both belts 24 and 26. Reference is briefly made to FIG. 10 which is illustrative of the force-time profile of the load generated in the belt upon activation of the pretensioner. This force/load is the tensile force generated in the torso and shoulder belts 26 and 24 connected to the buckle as little as 10 milliseconds after the firing of the pyrotechnic element 100. In the steady state it is anticipated that the residual preload force greater than the desired fifty pound (222N) limit, in this case about 100 lbs.

An optional second pyrotechnic element 110 may be fitted in the center bore of the pretensioner 38 which functions to provide additional force application to the piston over an extended time period. As shown this pyrotechnic element is hollow having a center core 112 through which the cable 76 slides. Upon ignition of the first pyrotechnic element 100, its products of combustion ignite the second pyrotechnic element 110 which in turn generates further products of combustion to increase the pressure applied to the piston 82.

The piston 82 is designed to complete its stroke prior to either of the shoulder or torso belt being loaded by the occupant as a result of a crash. Once these belts are loaded by the occupant, an outwardly directed force, generally shown as 114 is exerted on the buckle which will tend to move the buckle and cable 76 outwardly from the housing 40 opposite to the direction of the piston stroke. To prevent this reverse motion and to maintain the residual load, the cam lock 70 includes a lateral cam wall or cam surface 75 which extends across the side walls 72a and 72b, and which rotates with the cam lock, in a clock wise manner as the buckle is extended or pulled from the housing. The cam lock 70 rotates because of the frictional engagement with the cable 76. Upon rotation of the cam surface or member 75, the cable 76 is locked in place as it is pinched by member 75 preventing further the extension of the buckle 36 and cable 76. To increase the frictional interaction between the cable and the cam lock, the reel 74 may optionally include a knurled, i.e. uneven or rough surface 77. The cam lock 70 is biased by a bias spring 79 the purpose of which is to prevent the cam lock cam or surface 75 from becoming jammed as the cable is moved to the right which in turn attempts to rotate the cam lock counter clockwise. The spring rotates the cam lock to maintain a given amount of surface contact between the cable and the cam lock 70. As can be appreciated from the above, the pyrotechnic forces are primarily concentrated within the housing 40, as such the tube 44 need not absorb any of the pressure forces generated upon activation of the pyrotechnic elements 100 and 110. Consequently, the tube may be fabricated of a thin walled aluminum tubing. The end of the tube 44 is closed by a pin or cap 45.

Reference is made to FIGS. 11–16 which illustrate an emergency locking retractor 30 capable of achieving the energy absorption characteristics described above. The retractor 30 includes many components found in conventional retractors such as a U-shaped frame 150 having side walls 150a and 150b. Rotationally supported within the side or side walls 150a and 150b is a spool generally shown as 152. In the present invention, this spool 152 comprises a center core 154 having at its ends center hubs 156a and 156b (see FIG. 12). In the embodiment shown a solid shaft 158 is used, however, other type shafts may be employed such as a split core shaft. The shaft 158 includes end parts 158a and 158b received within slits 159a and 159b of each center hub 156a and 156b. The shaft is secured to each center hub using a metal forming technique. Secured about each center hub 156a,b is a lock wheel including a ring gear 162a and 162b respectively. Each ring gear includes a plurality of locking teeth 164 formed on its periphery. The ring gear 162 is shown in isolation in FIG. 13, in cross-section in FIG. 14 and in combination with one of the hubs in FIG. 15. The outer edge 200 of each center hub and an inner edge of each the ring gear 162, are secured together by a controlled fit, such as an interference fit generally shown as 166 which under normal operating conditions, permits the center hub 156 and ring gear 162 to rotate as a unified part. In additional, each ring gear 162a,b includes an inward radial extension 202 which provides added support for a side 204 of the hub. The hub is pressed against the extension 202. The purpose of this extension 202 will be described below.

The webbing 20 is secured to the core 154 of the spool 152 in a known manner. Spaced from each ring gear is a dual locking member generally shown as 170 having pawls 172a and 172b joined by a center shaft 174 (see FIG. 11). As can be appreciated the center shaft permits the pawls to be moved in unison. Such locking members are not shown in great detail as similar acting devices are know in the art. In normal operation the pawls 172a and 172b are spaced from the teeth 164 of each ring gear 162. During an emergency or crash situation, a sensor such as a vehicle sensor 180 itself having a movable pawl or mass, of known type, moves the pawls 177a and b into locking engagement with each ring gear.

Retractor 30, as does most if not all retractors, additionally includes a rewind spring 182 and may also include a web sensing mechanism. This web sensing mechanism is shown diagrammatically, and is mechanical coupled to move the locking member 170. Such web sensors are known in the art. As an example one such web sensor may include a clutch member used to move a movable plate which in turn moves the locking member by interaction with an extending pin (not shown).

Figure 16:
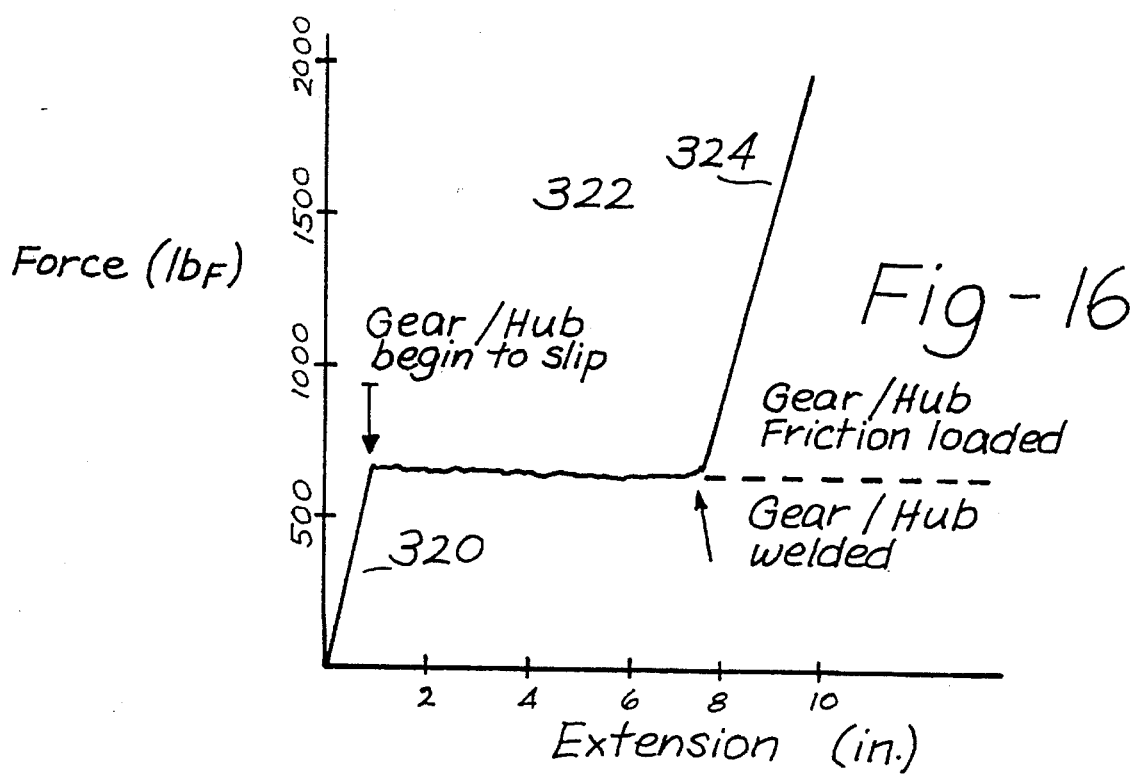

During an accident, and in response to the movement of one or the other of the web or vehicle sensor, the locking member 170 moves the pawls 172a and 172b into locking engagement with the teeth 164 of the ring gear to prohibit further rotation of the spool 152. The pretensioner 38 of the present invention is typically activated prior to or at least at the same time as the vehicle sensor begins to lock the retractor. Also, when the pretensioner 36 is activated it initiates the removal of a predetermined amount of slack webbing from the system and generates a defined residual load in the webbing at an amount that is greater than 50 lb. (222N). The above actions happen prior to or during the early moments when the occupant begins to move forward due to the decelerative forces imparted to the vehicle by the crash. Subsequent to the operation of the pretensioner, and as a result of the crash forces, the occupant moves forward, and engages the safety belts 20 and in particular the shoulder belt 24. As the occupant presses on the shoulder belt, forces are directed via the web guide or D-ring 32 and to the locked retractor. Reference is made to FIG. 16 which shows the force generated in the safety belt as the function of web extension with the retractor 30 locked. The first part of this graph shown as 320 is characterized by a relatively steep slope which is defined primarily by the elongation of the webbing. In a typical safety belt the elongation is about 8 percent. The slope of the curve will remain generally constant until the force imparted to the spool 152, the center hub 156 and ring gear 162 exceeds a predetermined lower limit (in this case about 500 lbs.) defined by the force necessary to overcome the interference fit between the center hubs 156 and the ring gears 162. Upon exceeding this force which is set to correspond to the desired force absorbing range such as 350 lbs (1557N) (up to about 2000 lbs.), the center hub 156 begins to slip and to rotate relative to the locked ring gear 162. As can be seen, the force-time graph at this time will achieve a generally flat slope. The value of the retarding forces generated during this time are basically limited by the slippage forces necessary to maintain the center hub 156 and ring gear 162 rotating relative to one another. Subsequently, as the relative rotation between the center hub 156 and ring gear 162 increases heat is generated causing, in one embodiment of the invention, these two components to friction welded together. In the present invention the ring gear and hub can be designed to weld together or remain friction loaded together after slippage has occurred. A benefit of permitting the ring gear and hub to be reattached or sufficiently loaded together is that even after the system has initially protected the occupant, that is during a first accident event and because the ring gears and hub are again physically joined by welding or physically frictionally coupled the spool will be able to be retracted by the rewind spring and the spool again can be locked in the event of a secondary impacts. The slope of the last section 324 of the curve is generally defined by the residual elongation of the webbing. By residual elongation it is meant the elongation remaining in the webbing after the initial accident. It is envisioned that the elongation of the webbing may change somewhat after it is stretched. In an embodiment where the parts remain friction loaded after slippage, the slope of the last part of the graph will be more horizontal as shown or at least correspond to the friction forces between the ring gears and hubs.

Figure 17:
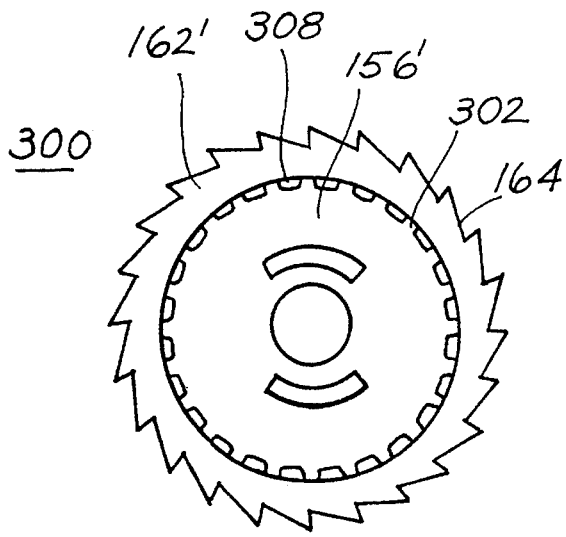
FIG. 17 illustrates a locking ring or gear usable with the present invention.
Figure 18:
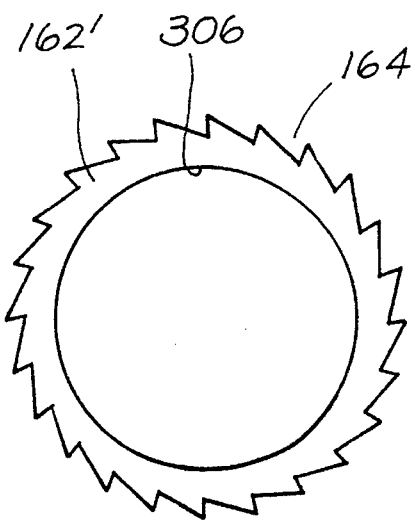
FIGS. 18 and 19 show the two primary components of the lock gear separately.
Figure 19:
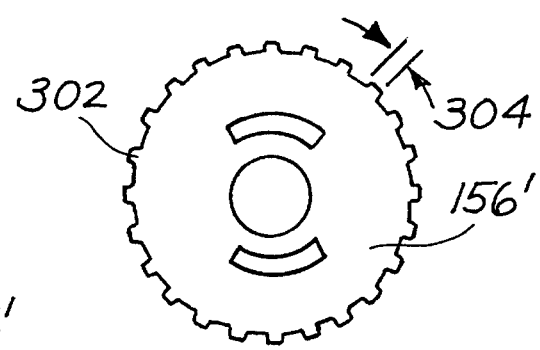

In the earlier embodiments of the invention a toothed ring gear 162 and center hub 156 were secured together by a controlled fit such as a press fit. In the alternate embodiments of the invention below the controlled fit between the ring gear 162 and center hub 156 is replaced with structure that is more suitable for high volume manufacturing. Reference is initially made to FIGS. 17–19. In this embodiment of the invention one or more lock rings 300 are used comprising a toothed ring gear 162' and a center hub 156' much the same as the earlier embodiments. As shown the center hub 156' includes a plurality of teeth 302. The thickness and width 304 of each tooth, that is, the material of each tooth 302 in engagement with the inner wall 306 of the ring gear 162, is chosen to provide an appropriate amount of surface contact therebetween to achieve a desired frictional slippage force therebetween and hence the desired generally constant belt reaction force. It is envisioned that in order to manufacture the completed lock ring 300 shown in FIG. 17 the process would begin by providing a single metal blank that may include preformed locking teeth 164. A progressive stamping procedure is used in which the center hub 156' is physically punched out of or cut from the ring gear 162'. The various cut outs 308 between each tooth 302 can be removed at this time or at a different time in the progressive stamping process. To ensure that all molecular bonds between the center hub 156' and ring gear 162' are removed, the blank is supported in the area that will become the ring gear 162. The center hub 156' is separated from the ring gear and pushed downward so that is no longer in contact with any part of the ring gear. Thereafter, the center hub is moved upward and returned so that it lies within the plane of the ring gear 162'. This type of metal forming technique is known in the art and need not be discussed in any depth.

Figure 20:
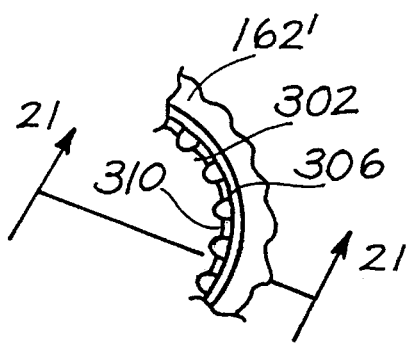
FIG. 20 shows a partial cross sectional view of a ring gear and center hub.
Figure 21:
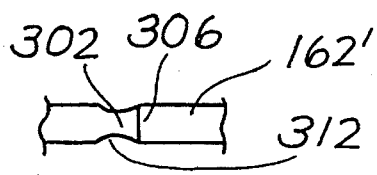
FIG. 21 is a partial cross sectional view through section line 21—21 of FIG. 20.

As can be appreciated, after the hub 156' is separated from the ring gear 162' a relatively small space, such as 307, will have been created therebetween (see FIG. 20) as a result of the removal of material resulting from the stamping process. The various dies used in the stamping process are arranged to maintain the concentricity between the center hub and the ring gear. This type of process step is also known in the art. With the hub concentric to the ring gear a die of the stamping machine impacts each tooth 302 forcing the tooth material outwardly into contact with the inner wall 306 of the ring gear 162' creating a controllable, interference fit therebetween. The die will impact the teeth generally along the location identified by the phantom circle 310 (see FIG. 20). To achieve a controlled and predictable interference fit the die must exert a sufficient force upon each tooth 302 that exceeds the yield strength of the tooth material. FIG. 21 is an exemplary cross sectional view through one of the teeth 302 showing the interference fit with the ring gear 162'. The effect of the stamping process is shown by the dimples 312 formed in the tooth 302. As can be appreciated the amount of torque required to produce the onset of slippage between the hub and the ring gear is determined by the surface area of contact therebetween, the yield stress of the material forming the tooth and the radius from the center of the hub to the contact area between the hub and the ring gear.

Figure 22:
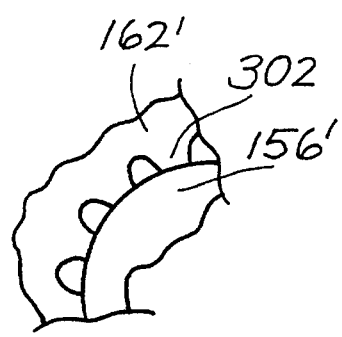
FIG. 22 and 23 show two additional embodiments of the invention.

FIG. 22 illustrates a further embodiment of the invention in which the teeth 302 are formed on the ring gear 162'. In this case the hub 156' is formed as a constant diameter disk.

Figure 23:
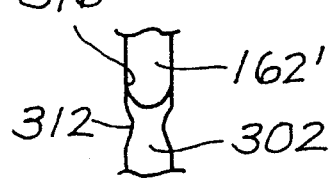

Reference is briefly made to FIG. 23 which illustrates a further embodiment of the invention. In this embodiment the inner wall or edge 306 of the ring gear 162' is coined such that its corners, generally shown as 316, are rounded. During the stamping process the tooth material is forced toward the edge 306 of the ring gear 162' and flows about the rounded corners 316. As can be seen the teeth form a trough that axially captures the inner edge of the ring gear 162' thereby preventing the lateral or axial displacement of the ring gear relative to the center hub.

Figure 24:
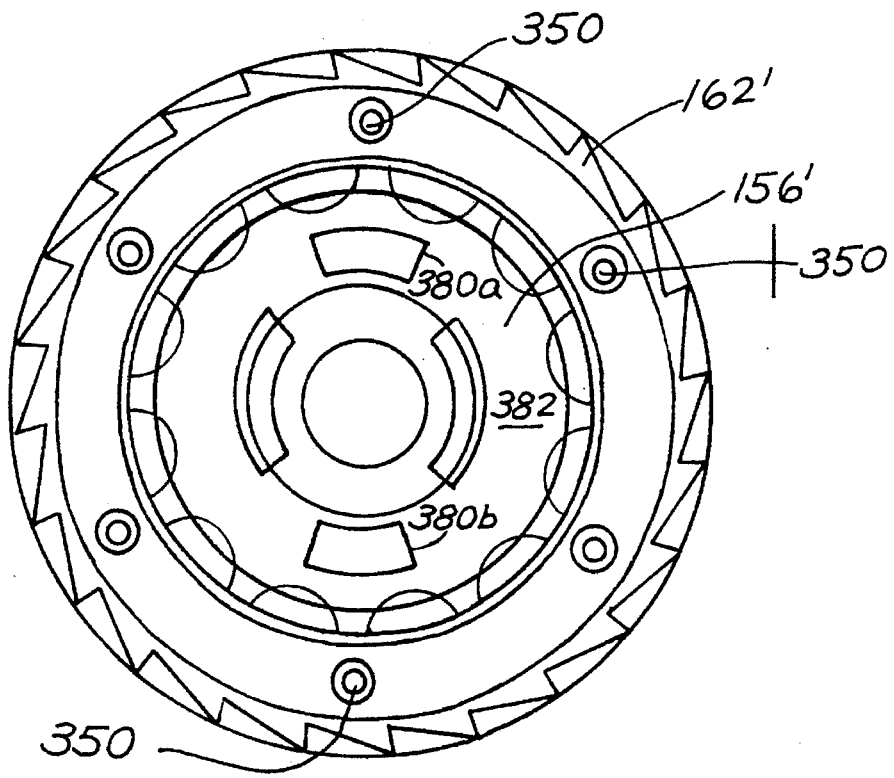
FIGS. 24 and 25 respectively show a plan view and cross sectional view of an additional embodiment of the present invention.
Figure 25:
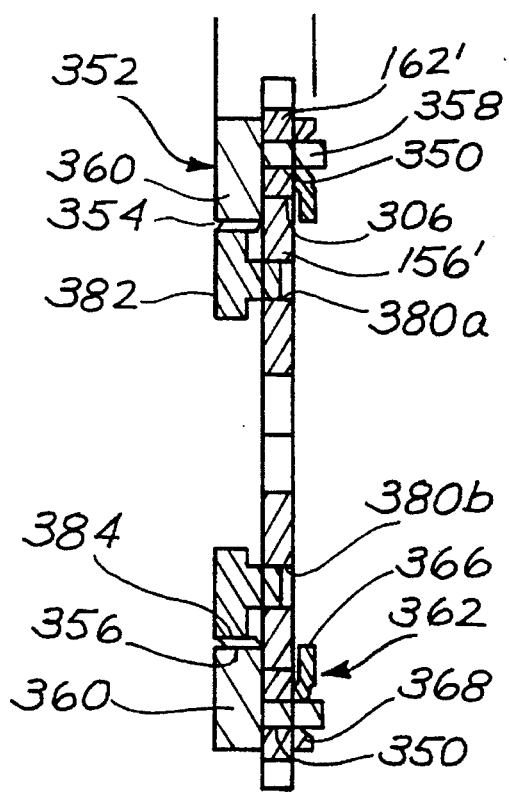

Reference is now made to FIGS. 24 and 25 which illustrates a further embodiment of the invention. This embodiment of the invention shows an alternate way of maintaining the lateral or axial stability between a toothed ring gear and a central hub and further provides a means for limiting the relative rotation between the hub and the ring gear. In this embodiment the ring gear 162 includes a plurality of openings 350. Mounted on one side of the ring gear is a positioning ring 352 having internal threads 354 formed on an inner wall 356 thereof. The positioning ring includes a plurality of rivets or studs 358 each of which extend through a cooperating opening 350 in the ring gear 162'. As can be seen from FIG. 25 the positioning ring 352 extends inwardly beyond the interface edge 306 between the ring gear 162' and the center hub 156'. Further, and as can be seen, an inner wall 353 of the positioning ring is slightly spaced from a side of the center hub 156' and ring gear. Positioned on the other side of the ring gear 162' is a second positioning ring 362. This positioning ring 362 includes an inward extending portion 366 that extends beyond the interface 306 of the ring gear and center hub and is also spaced therefrom. This second positioning ring additionally includes a plurality of openings 368, each of which receives a corresponding rivet or stud 358. Thereafter the rivet or stud is compressed sandwiching the ring gear 162' between the first and second positioning rings 352 and 358. As can be appreciated the extending portions 353 and 366 of the positioning rings act as laterally stops if the center hub were to slide relative to the ring gear. The spacings between the first and second positioning rings and the center hub 156' (and ring gear) avoid any undo interference to the rotation of the hub relative to the ring gear 162'. The center hub 156' is further provided with two opposing slots 380a and 380b. Fitted to the center hub 156' is a positioning third disk 382 having threads 384 on its outer periphery that threadably engage the threads 354 on the first positioning ring 352.

The operation of this embodiment of the invention is much like the earlier embodiments in that during normal operation of the retractor the center hub 156' is operationally coupled to the ring gear 162' so that these two bodies rotate in unison. Upon locking of the ring gear 162' with the locking pawl 172a (and/or 172b that is, if two ring gears 162' and hubs are provided), the center hub 156' will rotate after it is subjected to a predetermined level of torque bringing into operation the energy absorbing or dissipating features of the retractor in which a generally constant reaction belt force is generated.

Reference is briefly to FIG. 16 which also generally describes the relationship between the belt reactive force generated on the seat belt as a function of the movement of the energy absorbing components of the retractor or alternatively as a function of the extension of the seat belt. As can be seen the relationship between force and extension is first described by a first slope which then transitions to a relatively constant force portion of the curve. This constant force portion is achieved when the teeth 302 slip (rotate or slide) relative to the ring gear 162'. As the center hub 156' rotates relative to the ring gear 162' the third positioning ring 382 attach thereto rotates relative to the first positioning ring 352 at the threaded interface. As the center hub 156' rotates the interaction between the threads 354 and 384 draws the third positioning ring to the center hub 156' closing the spacing therebetween. After a predetermined number of revolutions of the center hub (and third positioning ring) relative to the ring gear, the center hub contacts the third positioning ring whereupon its rotation will be halted because of a binding of the threads. At this moment the center hub and ring gear become physically coupled through the threaded interface. This coupling will be evidenced by the increased slope portion of the reaction force-extension relationship as shown generally in FIG. 16. The amount of webbing that is permitted to be extracted from the retractor during the time the hub and ring gear is permitted to slip (i.e. the constant force portion of FIG. 16) can be varied to suit the specific application by varying the initial spacing between the positioning rings and the center hub as well as the number of teeth and pitch of the teeth 354 and 358.

It should be appreciated that the present invention could also utilize a retractor pretensioner having a moving piston that moves a cable that is attached to a clutch in stead of a buckle. The clutch in turn is selectively coupled to the reel or spool of the retractor to reverse rotate same to initially remove a predetermined amount of slack about the occupant.

Many changes and modifications in the above described embodiment of the invention can, of course, be carried out without departing from the scope thereof. Accordingly, that scope is intended to be limited only by the scope of the appended claims.

We claim:

1. A safety restraint system comprising:
    belt system means for restraining an occupant comprising:
    a safety belt;
    retractor means for protracting and retracting the safety belt;
    shoulder belt support means for supporting the shoulder belt portion of the safety belt;
    pretensioner means for providing subsequent to activation, a residual preload force in the safety belt in excess of a first low limit value of about 50 pounds;
    load limiting means for limiting the loads imparted by the shoulder belt portion to an occupant, operative after the preload acts on the shoulder belt portion, including first means for introducing a predetermined amount of slack in the shoulder belt when the belt tension is above a second low limit value and for preventing such slack introduction when belt tension is lower than such low limit value.

2. The device as defined in claim 1 wherein the second low limit value equal to or greater than 350 pounds.

3. The device as defined in claim 1 wherein the first low limit value is greater than about 50 pounds.

4. The device as defined in claim 1 wherein the second low limit value is in a range of 350 to 2000 pounds.

5. The device as defined in claim 1 wherein the first low limit value is in a range of 50 to 400 pounds.

6. The device as defined in claim 1 including an air bag and mean for inflating the air bag including an electronic sensing sub-system means for generating at least one control signal and inflator means for providing inflation gas to the air bag in response to at least one control signal.

7. A method of protecting an occupant in a safety system comprising a seat belt, a high output pretensioner operatively coupled to the seat belt and a load limiting device for permitting occupant motion, the method comprising the steps of:
    a. sensing an accident
    b. operating the pretensioning device to provide a residual preload in the belt in excess of about 50 pounds,
    c. permitting the load limiting device to absorb crash loads introduced on the occupant when such loads are in excess of about 350 pounds.

8. A safety restraint system comprising: belt system means for restraining an occupant comprising:
    a safety belt;
    retractor means for protracting and retracting the safety belt;
    shoulder belt support means for supporting the shoulder belt portion of the safety belt;
    load limiting means for limiting the loads imparted by the shoulder belt portion to an occupant, including first means for introducing a predetermined amount of slack in the shoulder belt when the belt tension is above a predetermined limit value and for preventing such slack introduction when belt tension is lower than such predetermined limit value.

9. The device as defined in claim 8 wherein the load limiting means includes:
    a rotatably mounted spool including a lock wheel (300) including a center hub (156) and a toothed ring (162) disposed thereabout, attachment means for joining the hub and ring at a common interface which separates subsequent to locking the toothed ring, upon being subjected to a predetermined torque, permitting relative rotation between the hub and the gear, corresponding to the predetermined low limit value of belt tension, and which generates a relatively constant reaction force opposing retraction of the belt.

10. The device as defined in claim 9 including lock means for locking the rotation of the toothed ring (162) operative during an emergency.

11. The device as defined in claim 9 wherein the attachment means includes a controlled fit between the hub and toothed gear.

12. The device as defined in claim 9 wherein the attachment means includes an interference fit between the hub and toothed gear.

13. The device as defined in claim 9 wherein one of the hub and gear includes teeth and wherein the other of the hub and gear includes a reaction surface (306) for receiving a mating part of the teeth.

14. The device as defined in claim 13 wherein a portion of each tooth is stressed to its yield limit and wherein an end of each tooth it urged into the mating surface as a result of the stressing.

15. The device s defined in claim 12 including limit means for limiting relative axial motion between the hub and the gear.

16. The device as defined in claim 15 wherein the limit means includes a positioning ring positioned adjacent and spaced from the hub.

17. The device as defined in claim 16 including a second positioning ring positioned adjacent opposite side of the hub.

18. The device as defined in claim 17 wherein the first positioning ring includes threads and wherein the hub includes a third positioning ring having threads that matingly engage the thread on the first positioning ring which upon relative rotation of the hub, the third positioning ring is drawn axially toward the hub and contacts the hub.

* * * * *